United States Patent
Wang et al.

(10) Patent No.: US 10,885,398 B2
(45) Date of Patent: Jan. 5, 2021

(54) JOINT 3D OBJECT DETECTION AND ORIENTATION ESTIMATION VIA MULTIMODAL FUSION

(71) Applicants: Chien-Yi Wang, Sunnyvale, CA (US); Athmanarayanan Lakshmi Narayanan, Sunnyvale, CA (US); Yi-Ting Chen, Sunnyvale, CA (US)

(72) Inventors: Chien-Yi Wang, Sunnyvale, CA (US); Athmanarayanan Lakshmi Narayanan, Sunnyvale, CA (US); Yi-Ting Chen, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 147 days.

(21) Appl. No.: 16/326,141

(22) PCT Filed: Mar. 16, 2018

(86) PCT No.: PCT/US2018/022995
§ 371 (c)(1),
(2) Date: Feb. 15, 2019

(87) PCT Pub. No.: WO2018/170472
PCT Pub. Date: Sep. 20, 2018

(65) Prior Publication Data
US 2019/0188541 A1 Jun. 20, 2019

Related U.S. Application Data

(60) Provisional application No. 62/473,054, filed on Mar. 17, 2017.

(51) Int. Cl.
*G06K 9/62* (2006.01)
*G06K 9/00* (2006.01)
(Continued)

(52) U.S. Cl.
CPC ............ *G06K 9/6293* (2013.01); *G01C 3/08* (2013.01); *G01S 7/4802* (2013.01); *G01S 17/42* (2013.01);
(Continued)

(58) Field of Classification Search
CPC ... G01S 17/42; G01S 7/4802; G06K 9/00805; G06K 9/6221; G06K 9/66; G06K 9/6293; G01C 3/08; G06N 3/0454
See application file for complete search history.

(56) References Cited

U.S. PATENT DOCUMENTS

| 8,488,877 B1 | 7/2013 | Owechko et al. | |
| 2015/0070470 A1* | 3/2015 | McMurrough | G06K 9/6211 348/46 |
| 2015/0138310 A1* | 5/2015 | Fan | G06K 9/00791 348/36 |

FOREIGN PATENT DOCUMENTS

| GB | 2545602 A * | 6/2017 | .......... G06K 9/4628 |
| WO | WO 2015/148824 A1 | 10/2015 | |

OTHER PUBLICATIONS

International Search Report of related International Application No. PCT/US18/22995 dated May 24, 2018.

* cited by examiner

*Primary Examiner* — Brandon J Miller
(74) *Attorney, Agent, or Firm* — Arent Fox LLP

(57) ABSTRACT

The present disclosure generally relates to methods and systems for identifying objects from a 3D point cloud and a 2D image. The method may include determining a first set of 3D proposals using Euclidean clustering on the 3D point cloud and determining a second set of 3D proposals from the 3D point cloud based on a 3D convolutional neural network. The method may include pooling the first and second sets of 3D proposals to determine a set of 3D candidates. The
(Continued)

method may include projecting the first set of 3D proposals onto the 2D image and determining a first set of 2D proposals using 2D convolutional neural network. The method may include pooling the projected first set of 3D proposals and the first set of 2D proposals to determine a set of 2D candidates then pooling the set of 3D candidates and the set of 2D candidates.

20 Claims, 7 Drawing Sheets

(51) Int. Cl.
*G01C 3/08* (2006.01)
*G06N 3/04* (2006.01)
*G01S 7/48* (2006.01)
*G01S 17/42* (2006.01)
*G06K 9/66* (2006.01)

(52) U.S. Cl.
CPC ....... *G06K 9/00805* (2013.01); *G06K 9/6221* (2013.01); *G06K 9/66* (2013.01); *G06N 3/0454* (2013.01)

JOINT 3D OBJECT DETECTION AND ORIENTATION ESTIMATION VIA MULTIMODAL FUSION

CROSS-REFERENCE TO RELATED APPLICATIONS

The present Application for Patent is a national stage entry of International Application PCT/US2018/022995 entitled "JOINT 3D OBJECT DETECTION AND ORIENTATION ESTIMATION VIA MULTIMODAL FUSION" filed Mar. 16, 2018, which claims priority to Provisional Application No. 62/473,054 entitled "JOINT 3D OBJECT DETECTION AND ORIENTATION ESTIMATION VIA MULTIMODAL FUSION" filed Mar. 17, 2017, both of which are assigned to the assignees hereof, and incorporated herein by reference in their entirety.

BACKGROUND

Understanding a three-dimensional (3D) scene may be helpful for many applications including automated driving and advance driving assist systems. In these applications, it may be helpful to localize and recognize different traffic participants, e.g., vehicles, pedestrians, and cyclists, for decision making, risk assessment, and motion planning. On an automated driving platform, multimodal sensory devices are commonly used, as each sensor has its pros and cons. Cameras and light detection and ranging (LiDAR) are two common perception sensors. Images contain a huge amount visual cues for recognition tasks. However, the image quality may be affected by different lighting variations, and it may be difficult to reconstruct depth information from image data due to the perspective projection. On the other hand, LiDAR sensors provide accurate depth measurements and are invariant to illumination. However, LiDAR sensor data is relatively sparse so that it may be difficult to recognize objects as accurately as in the image domain.

In view of the foregoing, there may be ways to more accurately detect objects of interest and estimate their orientation in 3D. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the disclosure provides a method for identifying objects from a 3D point cloud and a 2D image. The method may include determining a first set of 3D proposals using Euclidean clustering on the 3D point cloud. The method may include determining a second set of 3D proposals from the 3D point cloud based on a 3D convolutional neural network. The method may include pooling the first set of 3D proposals and the second set of 3D proposals to determine a set of 3D candidates. The method may include projecting the first set of 3D proposals onto the 2D image. The method may include determining a first set of 2D proposals based on the image using a 2D convolutional neural network. The method may include pooling the projected first set of 3D proposals and the first set of 2D proposals to determine a set of 2D candidates. The method may include pooling the set of 3D candidates and the set of 2D candidates.

In another aspect, the disclosure provides a vehicle including a camera configured to obtain a 2D image and a light detection and ranging (LiDAR) system configured to obtain a 3D point cloud. The vehicle may include a multimodal fusion system configured to identify objects from the 3D point cloud and the 2D image. The multimodal fusion system may include a memory and a processor communicatively coupled to the memory. The processor may be configured to determine a first set of 3D proposals using Euclidean clustering on the 3D point cloud. The processor may be configured to determine a second set of 3D proposals from the 3D point cloud based on a 3D convolutional neural network. The processor may be configured to pool the first set of 3D proposals and the second set of 3D proposals to determine a set of 3D candidates. The processor may be configured to project the first set of 3D proposals onto the 2D image. The processor may be configured to determine a first set of 2D proposals based on the image using a 2D convolutional neural network. The processor may be configured to pool the projected first set of 3D proposals and the first set of 2D proposals to determine a set of 2D candidates. The processor may be configured to pool the set of 3D candidates and the set of 2D candidates.

In another aspect, the disclosure provides a non transitory computer-readable medium including instructions that when executed by a processor cause the processor to identify objects from the 3D point cloud and the 2D image. The computer-readable medium may include instructions to determine a first set of 3D proposals using Euclidean clustering on the 3D point cloud. The computer-readable medium may include instructions to determine a second set of 3D proposals from the 3D point cloud based on a 3D convolutional neural network. The computer-readable medium may include instructions to pool the first set of 3D proposals and the second set of 3D proposals to determine a set of 3D candidates. The computer-readable medium may include instructions to project the first set of 3D proposals onto the 2D image. The computer-readable medium may include instructions to determine a first set of 2D proposals based on the image using a 2D convolutional neural network. The computer-readable medium may include instructions to pool the projected first set of 3D proposals and the first set of 2D proposals to determine a set of 2D candidates. The computer-readable medium may include instructions to pool the set of 3D candidates and the set of 2D candidates.

These and other aspects of the invention will become more fully understood upon a review of the detailed description, which follows.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
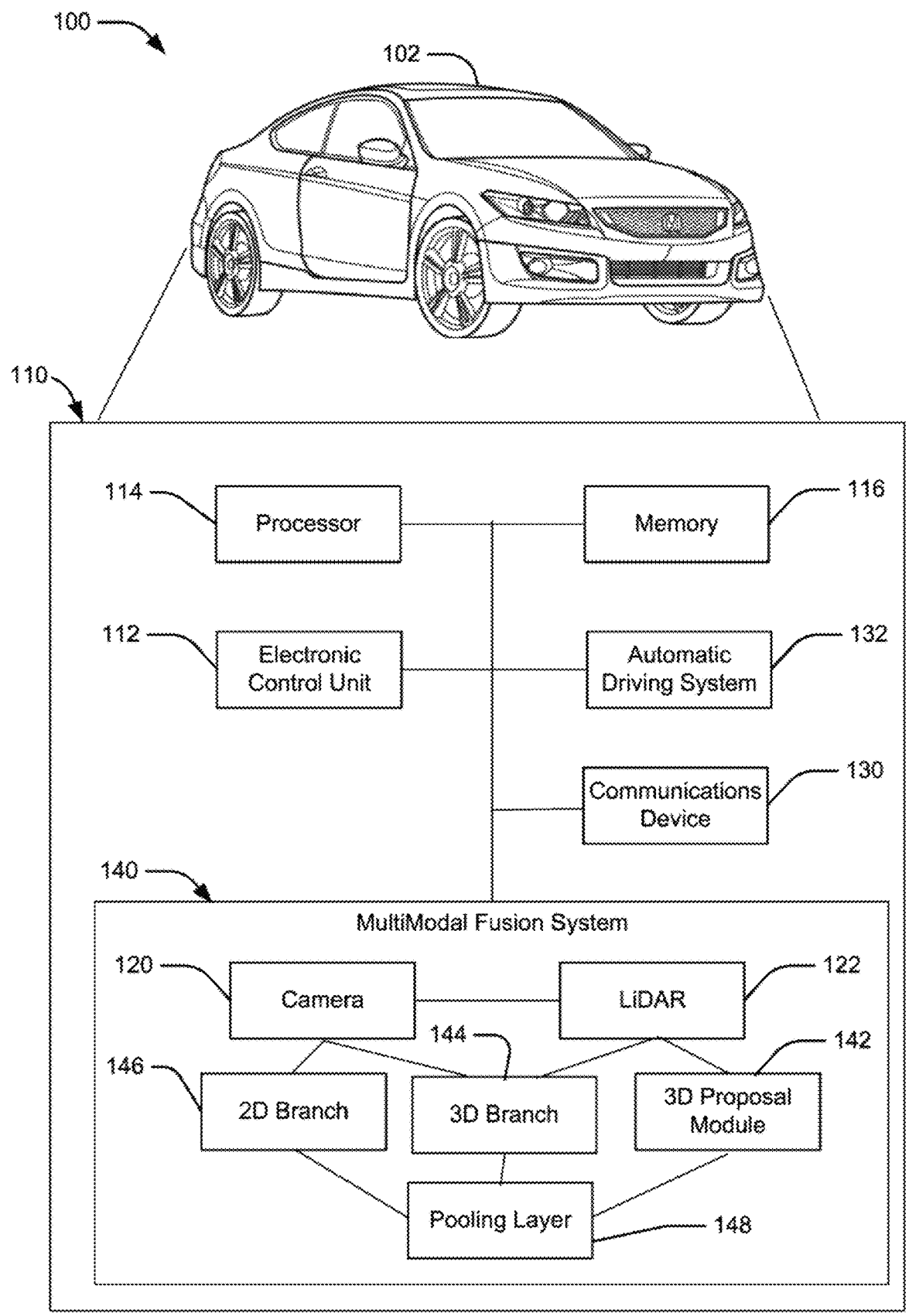
FIG. 1 illustrates a schematic view of an example operating environment of a multimodal fusion system for 3D object detection and orientation in accordance with aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Recent work on 2D object detection have made a huge progress due to the success of deep convolutional neural networks. However, reconstructing depth information from an image is known to be challenging as the depth information may be required for 3D object detection. This disclosure provides a system to leverage LiDAR point cloud data and image data to localize objects in 3D. The disclosure provides an effective 3D object proposal algorithm to handle multi-class objects in the driving scenario. The disclosure provides a framework that integrates 2D and 3D convolutional neural network with 2D and 3D region of interest (ROI) pooling. The disclosure provides a multimodal framework that uses a compact bilinear pooling algorithm to incorporate information from the image and the point cloud. The framework shows favorable results in challenging real-world datasets such as the KITTI dataset.

Turning to FIG. 1, a schematic view of an example operating environment 100 of an object detection system 110 for 3D object detection and orientation according to an aspect of the disclosure is provided. The object detection system 110 may reside within a vehicle 102. The components of the object detection system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the object detection system 110 including a multimodal fusion system 140, among others, including vehicle HVAC systems, vehicle audio systems, vehicle video systems, vehicle infotainment systems, vehicle telephone systems, and the like. The multimodal fusion system 140 may include a camera 120 or other image-capturing device (e.g., a scanner) that may also be connected to the ECU 112 to provide images of the environment surrounding the vehicle 102, as described in further detail below. The multimodal fusion system 140 may also include a LiDAR sensor 122 that may capture a 3D point cloud. The object detection system 110 may also include a processor 114 and a memory 116 that communicate with the camera 120, LiDAR sensor 122, communications device 130, and automatic driving system 132.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the object detection system 110.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

The vehicle 102 may include at least one camera 120. The camera 120 may be a digital camera capable of capturing one or more images or image streams, or may be another image capturing device, such as a scanner. The camera 120 may provide an image of a space directly in front of the vehicle 102. Other cameras may provide images of other spaces surrounding the vehicle 102. For example, a rear camera may be located above a bumper of the vehicle. The camera 120 may provide the image to a 2D branch 146 of the multimodal fusion system 140 and to a 3D branch 144 of the multimodal fusion system 140.

The vehicle 102 may include at least one light detection and ranging (LiDAR) sensor 122. The LiDAR sensor 122 may illuminate an area with a laser light and detect backscattering. The LiDAR sensor 122 may generate a 3D point cloud indicating potential locations where an object reflected the laser light. The LiDAR sensor 122 may also provide the 3D point cloud to the 3D branch 144 and a 3D proposal module 142 of the multimodal fusion system 140.

The vehicle 102 may include an automatic driving system 132 for controlling the vehicle 102. The automatic driving system 132 may include a lane keeping assistance system, a collision warning system, or a fully autonomous driving system, among other systems. The automatic driving system 132 may receive object position and orientation information from the multimodal fusion system 140. In an aspect, the multimodal fusion system 140 may be a component of the automatic driving system 132.

Figure 2:
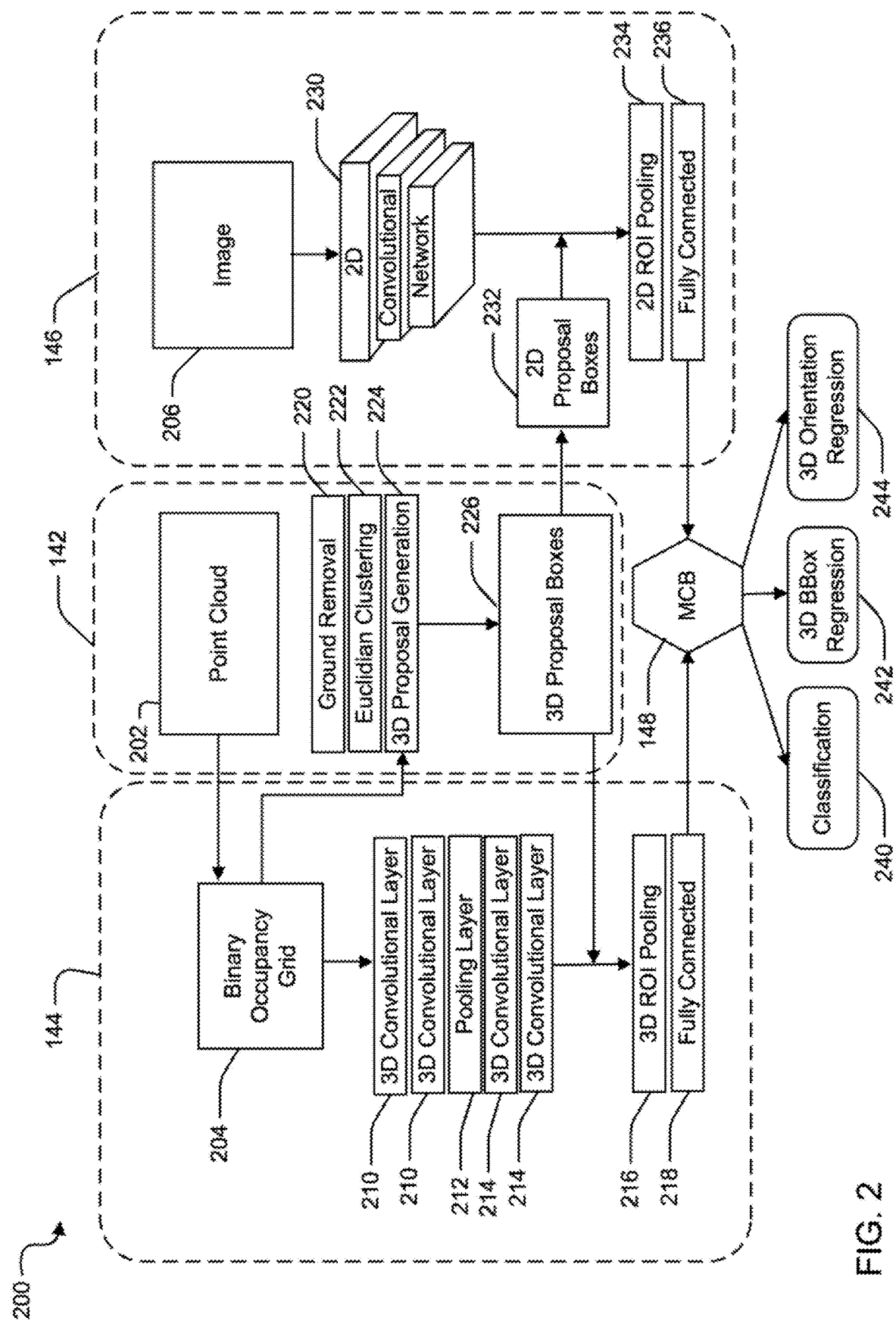
FIG. 2 illustrates a conceptual diagram showing an overall architecture for a multimodal fusion system in accordance with aspects of the present disclosure.

FIG. 2 illustrates a conceptual diagram 200 illustrating an overall framework of the multimodal fusion system. The whole framework is composed of several parts: a 3D object proposal module 142, a 3D neural network branch 144, a 2D neural network branch 146 and a multimodal compact bilinear (MCB) pooling layer 148 for detection and orientation estimation.

Figure 3:
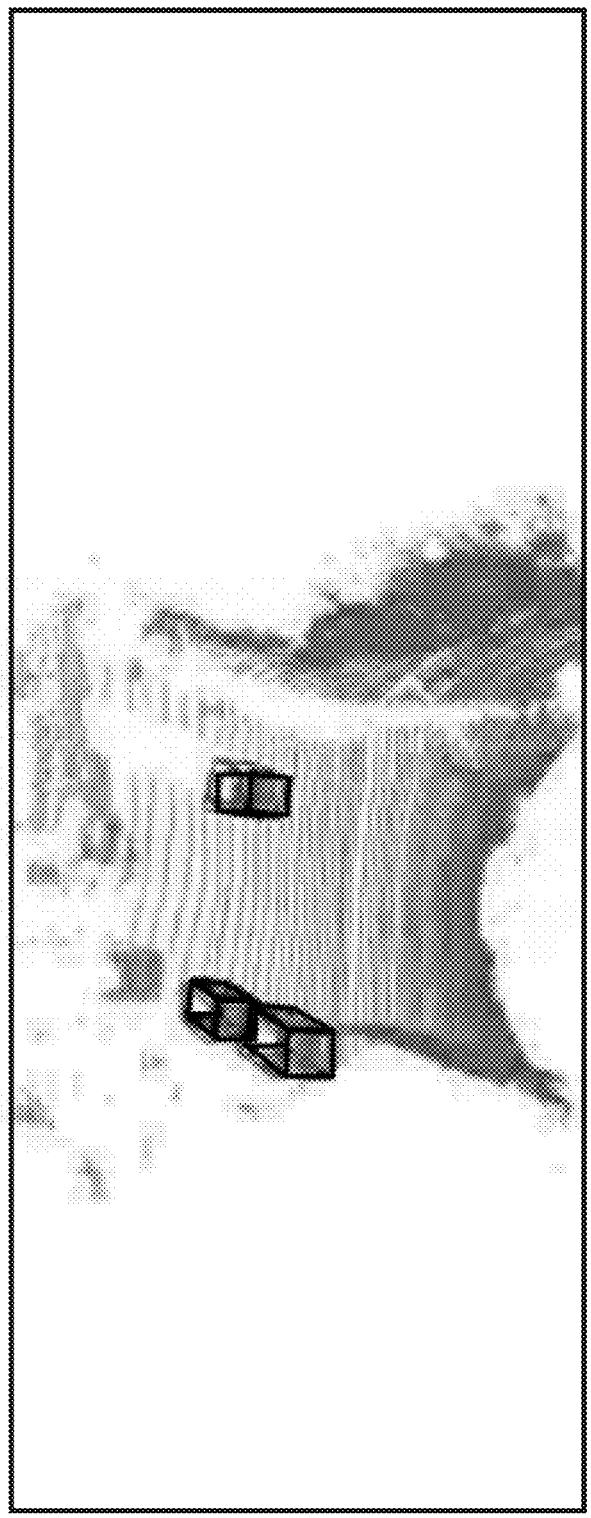
FIG. 3 illustrates an example 3D point cloud for object detection in accordance with aspects of the present disclosure.

The 3D object proposal module 142 may generate a small set of 3D candidate boxes in order to locate most foreground objects in 3D space. The 3D object proposal module 142 may leverage the occupancy estimation under discretized 3D grids and the 3D geometry analysis with raw point cloud to propose accurate object proposals in 3D space. FIG. 3 illustrates an example LiDAR point cloud 202. With a single frame of LiDAR point cloud 202 (e.g., from LiDAR sensor 122), it is challenging to locate every surrounding object due to occlusion and limits of LiDAR range. For example, the LiDAR rays hitting on a foreground object would occlude another object. As another example, the LiDAR rays for a distant object may be sparse due to the exponential LiDAR power decrease with longer distance. However, LiDAR can be utilized to the best ability of a single frame LiDAR point cloud to get a good estimation of the surroundings. By tracing every LiDAR ray in a single frame, the 3D object proposal module 142 can estimate the occupancy probability of the space. This method may be referred to as the binary occupancy grid model and may generate a binary occupancy grid 204. After discretizing the 3D space into voxels, the 3D object proposal module 142 may assume a binary state for each voxel, occupied or unoccupied. The 3D object proposal module 142 may iteratively update the occupancy log odds of each voxel which is traversed by LiDAR rays. For example, a procedure for updating the occupancy log odds of voxels is described in D. Maturana and S. Scherer, "VoxNet: A 3D Convolutional Neural Network for Real-Time Object Recognition." IROS, 2015, which is incorporated herein by reference. The 3D object proposal module 142 may produce an occupancy probability corresponding to each voxel ranging from [0, 1]. For voxels with no update in the procedure as they are behind the LiDAR hitting surface (e.g., an occluding surface), the 3D object proposals module may assume them as occupied and set the probability to 1, which differs from the procedure of Maturana and Scherer. The discretized occupancy grid not only provides LiDAR hitting surface which narrows down possible location of foreground objects, but also reduces the size of 3D input for further feature extraction in the end-to-end fusion network.

A single frame LiDAR point cloud 202 captured under the outdoor driving scenario has a similar pattern, and it is easy to extract meaningful clusters from it by considering only the geometry cues of raw LiDAR point cloud. The 3D object proposal module 142 may first remove the ground points using a ground removal module 220, which may for example execute a Progressive Morphological Filtering algorithm. An example algorithm is described in K. Zhang, S.-C. Chen, D. Whitman, M.-L. Shyu, J. Yan, and C. Zhang, "A Progressive Morphological Filter for Removing Nonground Measurements From Airborne LIDAR Data." IEEE TRANSACTIONS ON GEOSCIENCE AND REMOTE SENSING, 41 (4):872-882, 2003, which is incorporated herein by reference. The example algorithm is commonly used to extract ground points and is robust against bumps on the road. After ground points are gone from the point cloud, the 3D object proposals module 142 may use a Euclidean clustering module 222, which may execute a Euclidean clustering algorithm to cluster the rest of the point cloud 202 and obtain possible object clusters. For a point p in a cluster c, the 3D object proposals 142 module may denote the Euclidean distance between p and its nearest neighbor as $d_1$. If the distance $d_1$ is less than or equal with the threshold th, then the nearest neighbor is included in the cluster. As the distance between objects in the outdoor scene differs, different thresholds th may be selected to extract object clusters with different granularity.

Even though the object clusters obtained from 3D geometry analysis can indicate rough locations of surrounding objects, the 3D object proposal module 142 may further propose 3D boxes with more accurate location and size. The 3D object proposal module 142 may include a 3D proposal generation module 224 to parameterize each 3D proposal box 226 by (l, w, h, x, y, z), which are the size (length, width, and height) and center (x, y, z) (in meters) of the 3D proposal boxes 226 in the LiDAR coordinate system. The 3D object proposals module 142 may designate a small set of sizes, $S_{size}$, for 3D proposal boxes 226 which corresponds to common aspect ratios for target object categories. An example algorithm for 3D object proposal generation is described in X. Chen, H. Ma, J. Wan, B. Li, and T. Xia, "Multi-View 3D Object Detection Network for Autonomous Driving." in CVPR, 2017, which is incorporated herein by reference.

The 3D object proposal module 142 may cluster ground truth (GT) object sizes in the training set using a mean shift clustering algorithm to obtain $S_{size}$. For each object cluster obtained from 3D geometry analysis, the 3D object proposal module 142 may propose boxes with (l, w, h) $\in S_{size}$. The orientations of the proposals may be fixed to align with the major axis in the LiDAR coordinate system.

Regarding the location of each 3D proposal box 226, the z coordinate of the box center may be calculated based on a ground height from 3D geometry analysis and object height h. Determining (x, y) may utilize occupancy estimation in the 3D space derived from the occupancy grid 204. Intuitively, it may be assumed that the surrounding objects should not be in front of the LiDAR hitting surface and cover the free space. Therefore, by leveraging the LIDAR hitting surface cue from the occupancy grid 204, for each aspect ratio the 3D object proposal module 142 may generate a proposal box 226 which can simultaneously enclose the object cluster and cover most occupied space. The 3D object proposal module 142 may vary (x, y) to find the most occupied box, as z is already fixed. The boundary of the object cluster on the xy-plane may be denoted; ($Obj_{xmin}$, $Obj_{ymin}$, $Obj_{xmax}$, $Obj_{ymax}$). With proposal size (l, w), the possible location of the center ranges from [$Obj_{xmax}$−l/2, Objxmin+l/2]×[$Obj_{ymax}$−w/2, $Obj_{ymin}$+w/2]. For each possible location of the center, the 3D object proposal module 142 may calculate the sum of occupancy odds in the box, and finally choose the one with maximum occupancy probability. If the object cluster is too big to be enclosed by the box, which happens when $Obj_{xmax}$−l/2>$Obj_{xmin}$+l/2 or $Obj_{ymax}$−w/2>Objymin+w/2, then the 3D object proposal module 142 may generate a box 226 with x=($Obj_{xmin}$+$Obj_{xmax}$)/2 and y=($Obj_{ymin}$+$Obj_{ymax}$)/2 as the object clusters are not always perfect. In the end, if there are N different sizes in $S_{size}$, and K object clusters from 3D geometry analysis, then there will be NK different proposal boxes. The proposal number will be different for every frame of point cloud, as the number of object cluster K from 3D geometry analysis is different.

Figure 4:
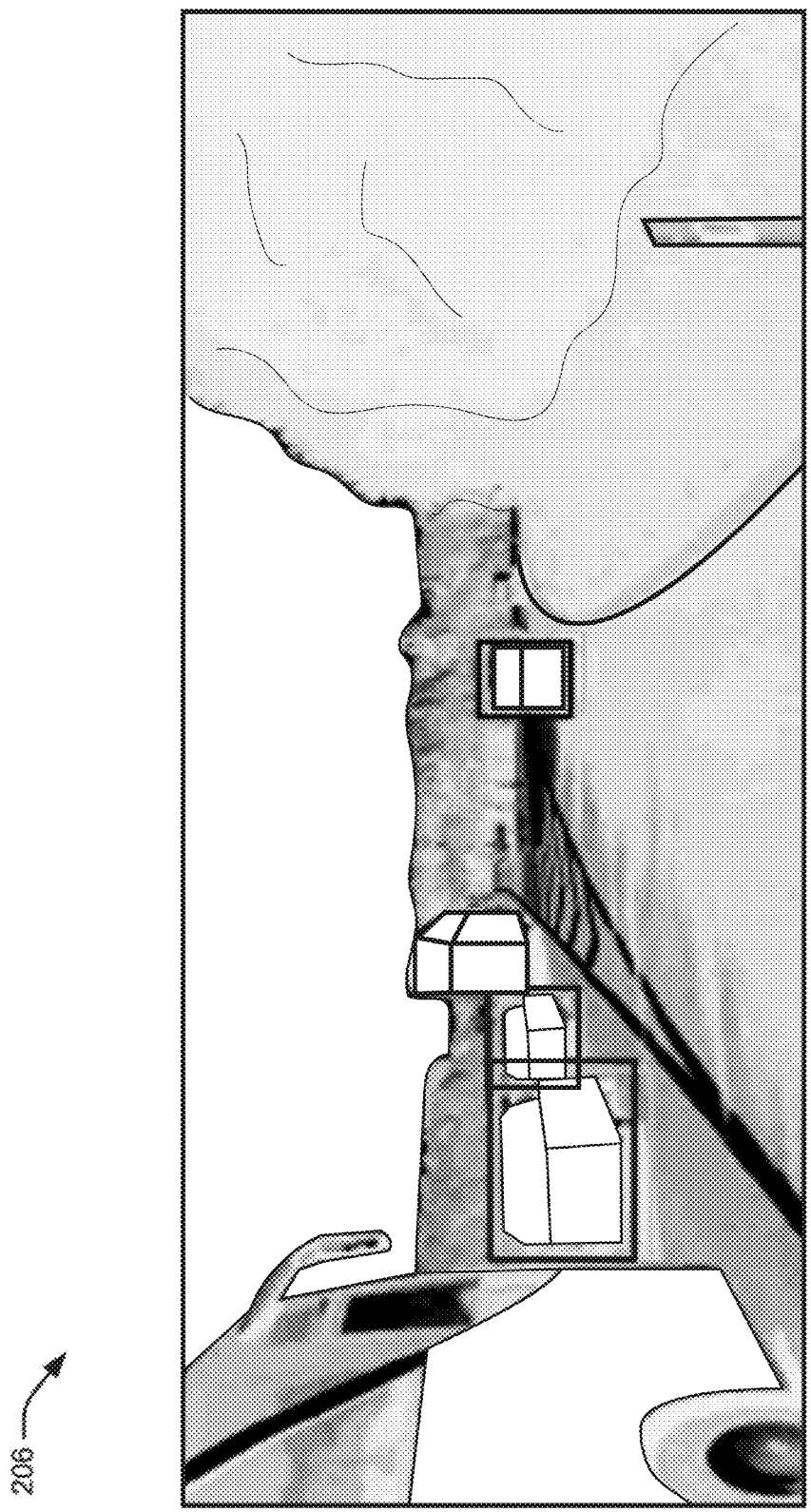
FIG. 4 illustrates an example 2D image for object detection in accordance with aspects of the present disclosure.

The multimodal fusion system 140 may provide accurate 3D localization and classification results from multimodal information. While the LiDAR point cloud 202 can provide more robust 3D localization (including location and orientation) of objects, analysis of the LiDAR point cloud 202 cannot recognize an object well with sparse data. On the other hand, the image 206 has much better ability for recognizing objects as the image 206 has information from red-green-blue (RGB) channels and provides more densely structured data. FIG. 4 illustrates an example image 206 showing a representation of the same environment as the point cloud 202 in FIG. 3. Therefore, the multimodal fusion system 140 may use the 3D neural network branch 144 and the 2D neural network branch 146 to leverage advantages from both sets of data and may jointly classify 3D object proposals and do 3D proposal boxes regression.

The 3D branch 144 of the multimodal fusion system 140 may take as input the entire occupancy grid 204, which represents the original 3D LIDAR point cloud 202 with lower resolution. The 3D branch 144 may extract features using several 3D convolutional layers 210, 214 and max pooling layers 212. The 3D branch 144 may produce a convolutional feature map in 3D for each 3D proposal box 226. An example technique is described in R. Girshick, "Fast R-CNN" in ICCV, 2015, which is incorporated herein by reference. The 3D branch 144 may use a 3D region of interest (ROI) pooling layer 216 to extract fixed size 3D feature vectors from the feature map output by the convolutional layers 214. A fully connected layer 218 may be stacked at the end of the 3D branch 144 to flatten the feature vector for further fusion process.

For the network design, the example 3D branch 144 stacks two 3D convolutional layers 210 with a max pooling layer 212, followed by another two 3D convolutional layers 214 to extract features from the occupancy grid. For example, the 3D convolutional layers 210 may use parameters of (32, 5, 2, 1) for the neural networks. The convolutional layers 214 may use parameters of (64, 5, 2, 1) for the neural networks. The size of target objects (e.g., car, pedestrian, cyclist) in a traffic scene (e.g., point cloud 202) may be very small compared with the whole 3D space, so the 3D branch 144 may apply only one max pooling layer 212 to keep a large feature map in order to detect those small objects. As the structured information is less in the occupancy grid 204 compared with the image 206, this architecture design was found to provide for learning powerful representations in 3D.

The 2D branch 146 of the fusion network 200 may include a 2D convolutional network 230 such as a Fast-RCNN network as described by Girshick. The Fast-RCNN network may take an entire image 206 as input, and may produce 2D feature maps using a VGG16 network. Additionally, 2D proposal boxes 232 may be obtained from 3D proposal boxes 226 by projection. Then a 2D ROI pooling layer 234 may extract fixed 2D feature vectors for each 2D proposal box 232. Next, a fully connected layer 236 may flatten the 2D feature vectors as in the 3D branch 144.

In order to leverage advantages from both inputs (point cloud 202 and image 206), a multimodal compact bilinear (MCB) pooling layer 148 may be used to efficiently and expressively combine multimodal features. The original bilinear pooling model computed the outer product between two vectors, which allows a multiplicative interaction between all elements of both vectors. Then, the original bilinear pooling model utilized a Count Sketch projection function to reduce the dimensionality and improve the efficiency of bilinear pooling. Examples of original bilinear pooling models are described in A. Fukui, D. H. Park, D. Yang, A. Rohrbach, T. Darrell, and M. Rohrbach, "Multimodal Compact Bilinear Pooling for Visual Question Answering and Visual Grounding" in arXiv, 2016 and Y. Gao, O. Beijbom, N. Zhang, and T. Darrell, "Compact Bilinear Pooling" in CVPR, 2016, both of which are incorporated by reference herein. The original compact bilinear pooling layer was applied to a visual question answering task by combining multi-modal features from visual and textual representations. The success of multimodal compact bilinear pooling has shown its potential of handling fusion of features from two very different domains.

In an aspect, the multimodal compact bilinear pooling layer 148 may take two flattened feature vectors extracted from the 3D domain by the 3D branch 144 and from the 2D domain by the 2D branch 146 and produce a 4096-D multimodal representation for classification and 3D bounding box regression. The classification may be performed by the classification module 240.

Given the fusion representation from the multimodal compact bilinear pooling layer 148, the bounding box regression module 242 may regress the orientation and size of the 3D bounding boxes from the 3D proposal boxes 226. For the size regression, similar to Fast-RCNN, the bounding box regression module 242 may parameterize the regression target by t=($\Delta x, \Delta y, \Delta z, \Delta l, \Delta w, \Delta h$), where ($\Delta x, \Delta y, \Delta z$) are the center offsets normalized by proposal sizes, and ($\Delta l, \Delta w, \Delta h$) are computed as $\Delta s = \log(s_{GT}/s_{proposal})$, $s \in \{l, w, h\}$. For the orientation regression, the 3D orientation regression module 244 may parameterize the regression target by $\Delta\theta = \theta_{GT} - \theta_{proposal}$, where θ is the rotation angle of the 3D bounding box around z-axis. In the vehicle setting, the ground truth (GT) is annotated, such that (l, w, h) are always aligned with the (x, y, z) axes, so the angle range can be restricted in [−π/4, π/4], which makes orientation regression easier. Because the proposal boxes are set to align with the major axis in LIDAR coordinates ($\theta_{proposal}=0$), the orientation target can be simplified as $\Delta\theta = \Delta_{GT}$.

Figure 5:
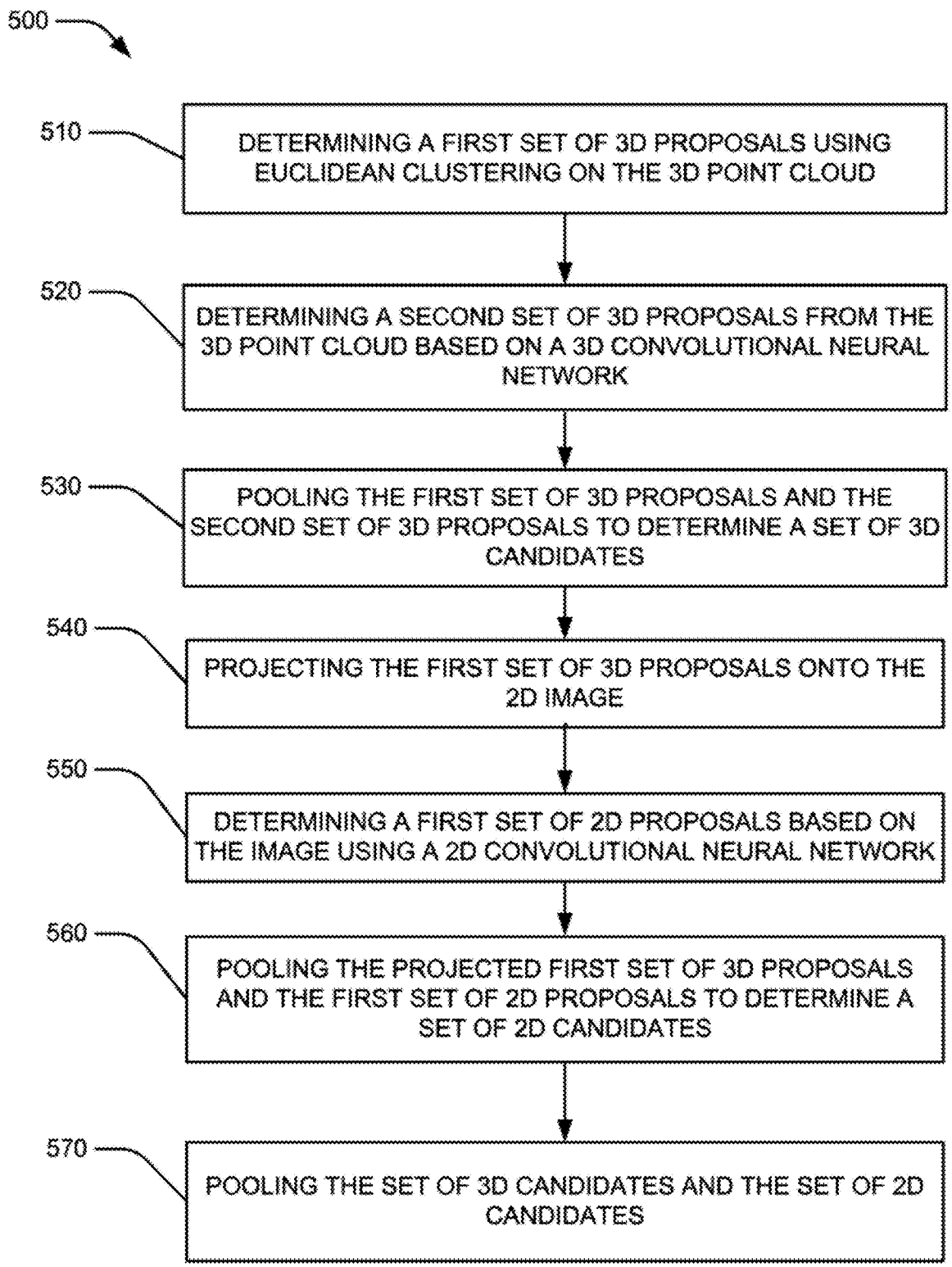
FIG. 5 illustrates a flowchart showing an example method of object detection and localization in accordance with aspects of the present disclosure.

FIG. 5 illustrates a flowchart of an example method 500 for detecting objects and orientations. The method 500 may be performed by an object detection system 110 within a vehicle 102.

At block 510, the method 500 may include determining a first set of 3D proposals using Euclidean clustering on the 3D point cloud. In an aspect, for example, the 3D proposal module 142 may determine a first set of 3D proposals using Euclidean clustering on the 3D point cloud. In an aspect, the block 510 may include generating an occupancy grid representing discretized voxels of the 3D point cloud. For example, the 3D proposal module 142 may generate the binary occupancy grid 204. The block 510 may include designating each voxel as either occupied or unoccupied based on the 3D point cloud. For example, the 3D proposal module 142 may designate each voxel of the binary occupancy grid 204 as either occupied or unoccupied based on the point cloud 202. The block 510 may include updating the occupancy grid with an occupancy probability corresponding to voxels traversed by LiDAR rays. For example, the 3D proposal module 142 may update the binary occupancy grid 204 with an occupancy probability corresponding to the voxels traversed by LiDAR rays. The block 510 may include setting the occupancy probability of occluded voxels to indicate that the voxel is occupied. For example, the 3D proposal module 142 may set the occupancy probability of occluded voxels in the binary occupancy grid 204 to indicate that the voxel is occupied. For examples, voxels that are occluded by a surface may be assumed to be occupied by an object behind the surface.

In another aspect, the block 510 may include removing ground points from the 3D point cloud. For example, the ground removal module 220 may remove ground points from the point cloud 202. The block 510 may include clustering points of the point cloud having a Euclidean distance less than a threshold into proposed clusters. For example, the Euclidian clustering module 222 may cluster points of the point cloud 202 having a Euclidean distance less than a threshold into proposed clusters.

In an aspect, the block 510 may include parameterizing each proposed cluster as a 3D proposal box having a length, width, height, and center coordinates. For example, the 3D proposal generation module 224 may parameterize each proposed cluster as a 3D proposal box 226 having a length, width, height, and center coordinates. The 3D proposal generation module 224 may set a z-coordinate of the center coordinates based on a ground height (determined by ground removal module 220) and the height of the proposal box 226. In an aspect, the block 510 may include generating at least one proposal box 226 having a fixed length and height. The x-coordinate and y-coordinate of the center coordinates of the proposal box 226 may be selected to maximize an occupancy probability of voxels within the proposal box 226. For example, the 3D proposal generation module 224 may set the fixed length and height (e.g., based on a predetermined object type) and select the x-coordinate and y-coordinate that maximize the occupancy of the proposal box 226. The 3D proposal generation module 224 may generate a plurality of proposal boxes for a proposed cluster, each proposal box having a different combination of length, height, and width (e.g., corresponding to different predetermined object types). At block 520, the method 500 may include determining a second set of 3D proposals from the 3D point cloud based on a 3D convolutional neural network. In an aspect, for example, the 3D branch 144 may determine a second set of 3D proposals from the 3D point cloud based on a 3D convolutional neural network. In an aspect, the 3D branch 144 may apply the multiple convolutional layers and at least one max pooling layer to produce a convolutional feature map including the second set of 3D proposals. For example, the 3D convolutional neural network may include the 3D convolutional layers 310, the max pooling layer 212, and the 3D convolutional layers 312.

At block 530, the method 500 may include pooling the first set of 3D proposals and the second set of 3D proposals to determine a set of 3D candidates. In an aspect, for example, the 3D branch 144 may pool the first set of 3D proposals and the second set of 3D proposals to determine a set of 3D candidates. In an aspect, pooling the first set of 3D proposals and the second set of 3D proposals in block 530 may include extracting fixed size 3D feature vectors from the convolutional feature map for each 3D proposal of the second set of 3D proposals. For example, the 3D ROI pooling layer 144 may extract the fixed size 3D feature vectors from the convolutional feature map for each 3D proposal of the second set of 3D proposals. Block 530 may also include flattening the fixed size 3D feature vectors using a fully connected layer. For example, the 3D branch 144 may flatten the fixed size 3D feature vectors using the fully connected layer 218.

At block 540, the method 500 may include projecting the first set of 3D proposals onto the 2D image. In an aspect, for example, the 2D branch 146 may project the first set of 3D proposals onto the 2D image. The 2D branch 146 may generate the 2D proposal boxes 232.

At block 550, the method 500 may include determining a first set of 2D proposals based on the image using a 2D convolutional neural network. In an aspect, for example, the 2D branch 146 may determine a first set of 2D proposals based on the image using the 2D convolutional neural network 230. For example, the 2D convolutional neural network 230 may produce 2D feature maps including the first set of 2D proposals.

At block 560, the method 500 may include pooling the projected first set of 3D proposals and the first set of 2D proposals to determine a set of 2D candidates. In an aspect, for the multimodal compact bilinear pooling layer 148 may pool the projected first set of 3D proposals and the first set of 2D proposals to determine a set of 2D candidates.

At block 570, the method 500 may include pooling the set of 3D candidates and the set of 2D candidates. In an aspect, for example, the multimodal compact bilinear pooling layer 148 may pool the set of 3D candidates and the set of 2D candidates. In an aspect, block 570 may include computing the outer product between 3D feature vectors representing the set of 3D candidates and 2D feature vectors representing the set of 2D candidates to generate a multimodal representation. Block 570 may further include regressing a size and orientation of the 3D proposal boxes from the multimodal representation. For example, the 3D bounding box regression module 242 may regress the size of the 3D proposal boxes and the 3D orientation regression nodule 244 may regress the orientation of the 3D proposal boxes.

Figure 6:
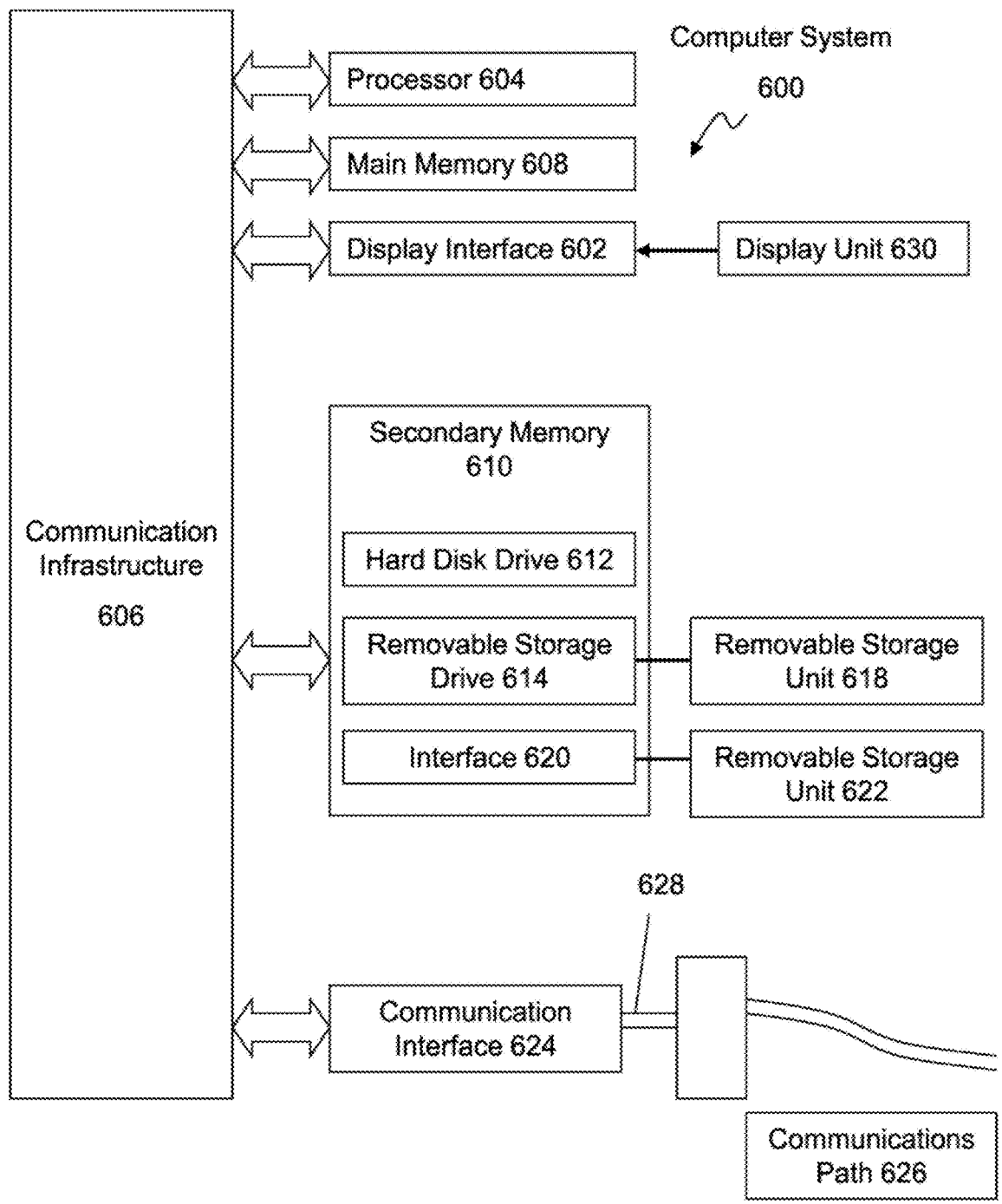
FIG. 6 presents an exemplary system diagram of various hardware components and other features, for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 6 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 600 is shown in FIG. 6.

Computer system 600 includes one or more processors, such as processor 604. The processor 604 is connected to a communication infrastructure 606 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 600 may include a display interface 602 that forwards graphics, text, and other data from the communication infrastructure 606 (or from a frame buffer not shown) for display on a display unit 630. Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc., which is read by and written to removable storage drive 614. As will be appreciated, the removable storage unit 618 includes a computer usable storage medium having stored therein computer software and/or data.

In alternative aspects, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 680, a hard disk installed in hard disk drive 670, and signals 628. These computer program products provide software to the computer system 600. Aspects of the disclosure are directed to such computer program products.

Computer programs (also referred to as computer control logic) are stored in main memory 608 and/or secondary memory 610. Computer programs may also be received via communications interface 624. Such computer programs, when executed, enable the computer system 600 to perform various features in accordance with aspects of the present disclosure, as discussed herein. In particular, the computer programs, when executed, enable the processor 604 to perform such features. Accordingly, such computer programs represent controllers of the computer system 600.

In variations where aspects of the disclosure are implemented using software, the software may be stored in a computer program product and loaded into computer system 600 using removable storage drive 614, hard drive 612, or communications interface 620. The control logic (software), when executed by the processor 604, causes the processor 604 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 7:
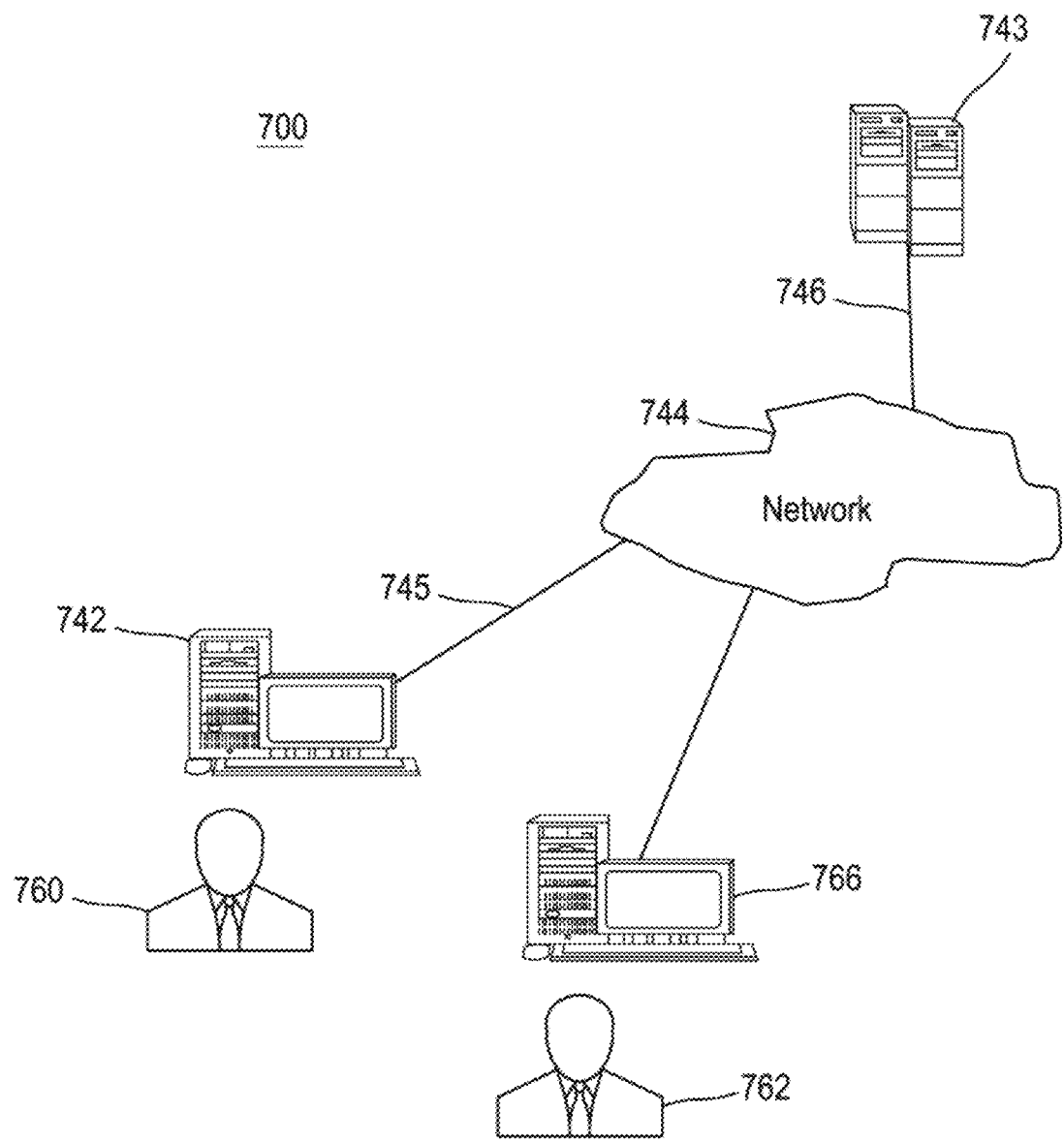
FIG. 7 is a block diagram of various exemplary system components, for use in accordance with aspects of the present disclosure.

FIG. 7 is a block diagram of various example system components that may be used in accordance with aspects of the present disclosure. For example, the various components may be within the vehicle 102, or only some of the components may be within the vehicle 102, and other components may be remote from the vehicle 102. The system 700 includes one or more accessors 760, 762 (also referred to interchangeably herein as one or more "users") and one or more terminals 742, 766 (such terminals may be or include, for example, various features of the object detection system 110). In one aspect, data for use in accordance with aspects of the present disclosure is, for example, input and/or accessed by accessors 760, 762 via terminals 742, 766, such as personal computers (PCs), minicomputers, mainframe computers, microcomputers, telephonic devices, or wireless devices, such as personal digital assistants ("PDAs") or a hand-held wireless devices coupled to a server 743, such as a PC, minicomputer, mainframe computer, microcomputer, or other device having a processor and a repository for data and/or connection to a repository for data, via, for example, a network 744, such as the Internet or an intranet, and couplings 745, 746, 764. The couplings 745, 746, 764 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A method of identifying objects from a 3D point cloud and a 2D image comprising:
    determining a first set of 3D proposals using Euclidean clustering on the 3D point cloud;
    determining a second set of 3D proposals from the 3D point cloud based on a 3D convolutional neural network;
    pooling the first set of 3D proposals and the second set of 3D proposals to determine a set of 3D candidates;
    projecting the first set of 3D proposals onto the 2D image;
    determining a first set of 2D proposals based on the image using a 2D convolutional neural network;
    pooling the projected first set of 3D proposals and the first set of 2D proposals to determine a set of 2D candidates; and
    pooling the set of 3D candidates and the set of 2D candidates.

2. The method of claim 1, wherein determining a first set of 3D proposals using Euclidean clustering on the 3D point cloud comprises:
    generating an occupancy grid representing discretized voxels of the 3D point cloud;
    designating each voxel as either occupied or unoccupied based on the 3D point cloud;
    updating the occupancy grid with an occupancy probability corresponding to voxels traversed by LiDAR rays; and
    setting the occupancy probability of occluded voxels to indicate that the voxel is occupied.

3. The method of claim 1, wherein determining a first set of 3D proposals using Euclidean clustering on the 3D point cloud comprises:
    removing ground points from the 3D point cloud; and
    clustering points of the point cloud having a Euclidean distance less than a threshold into proposed clusters.

4. The method of claim 3, wherein determining a first set of 3D proposals using Euclidean clustering on the 3D point cloud further comprises:
    parameterizing each proposed cluster as a 3D proposal box having a length, width, height, and center coordinates.

5. The method of claim 4, wherein parameterizing each proposed cluster comprises:
    setting a z-coordinate of the center coordinates based on a ground height and object height;
    generating at least one proposal box having a fixed length and height and x and y coordinates that maximize an occupancy probability of voxels within the proposal box.

6. The method of claim 5, wherein generating the at least one proposal box comprises generating a plurality of proposal boxes for a proposed cluster, each proposal box having a different combination of length, height, and width.

7. The method of claim 1, wherein determining a second set of 3D proposals from the 3D point cloud based on a 3D convolutional neural network comprises applying multiple convolutional layers and at least one max pooling layer to produce a convolutional feature map including the second set of 3D proposals.

8. The method of claim 7, wherein pooling the first set of 3D proposals and the second set of 3D proposals comprises:
    extracting fixed size 3D feature vectors from the convolutional feature map for each 3D proposal of the second set of 3D proposals; and
    flattening the fixed size 3D feature vectors using a fully connected layer.

9. The method of claim 1, wherein determining the first set of 2D proposals based on the image using a 2D convolutional neural network comprises producing 2D feature maps using the 2D convolutional neural network.

10. The method of claim 1, wherein pooling the projected first set of 3D proposals and the first set of 2D proposals to determine a set of 2D candidates comprises extracting fixed 2D feature vectors for each 2D proposal box.

11. The method of claim 1, wherein pooling the set of 3D candidates and the set of 2D candidates comprises computing the outer product between 3D feature vectors representing the set of 3D candidates and 2D feature vectors representing the set of 2D candidates to generate a multimodal representation.

12. The method of claim 11, wherein pooling the set of 3D candidates and the set of 2D candidates comprises regressing size and orientation of the 3D proposal boxes from the multimodal representation.

13. A vehicle comprising:
    a camera configured to obtain a 2D image;
    a light detection and ranging (LiDAR) system configured to obtain a 3D point cloud; and
    a multimodal fusion system configured to identify objects from the 3D point cloud and the 2D image, the multimodal fusion system including a memory and a processor communicatively coupled to the memory, the processor configured to:
        determine a first set of 3D proposals using Euclidean clustering on the 3D point cloud;
        determine a second set of 3D proposals from the 3D point cloud based on a 3D convolutional neural network;
        pool the first set of 3D proposals and the second set of 3D proposals to determine a set of 3D candidates;
        project the first set of 3D proposals onto the 2D image;
        determine a first set of 2D proposals based on the image using a 2D convolutional neural network;
        pool the projected first set of 3D proposals and the first set of 2D proposals to determine a set of 2D candidates; and
        pool the set of 3D candidates and the set of 2D candidates.

14. The vehicle of claim 13, wherein the processor is configured to:
    generate an occupancy grid representing discretized voxels of the 3D point cloud;
    designate each voxel as either occupied or unoccupied based on the 3D point cloud;
    update the occupancy grid with an occupancy probability corresponding to voxels traversed by LiDAR rays; and
    set the occupancy probability of occluded voxels to indicate that the voxel is occupied.

15. The vehicle of claim 13, wherein the processor is configured to:
    remove ground points from the 3D point cloud; and
    cluster points of the point cloud having a Euclidean distance less than a threshold into proposed clusters, parameterize each proposed cluster as a 3D proposal box having a length, width, height, and center coordinates.

16. The vehicle of claim 13, wherein the processor is configured to apply multiple convolutional layers and at least one max pooling layer to produce a convolutional feature map including the second set of 3D proposals.

17. The vehicle of claim 16, wherein the processor is configured to:
   extract fixed size 3D feature vectors from the convolutional feature map for each 3D proposal of the second set of 3D proposals; and
   flatten the fixed size 3D feature vectors using a fully connected layer.

18. The vehicle of claim 13, wherein the processor is configured to extract fixed 2D feature vectors for each 2D proposal box to determine the set of 2D candidates.

19. The vehicle of claim 13, wherein the processor is configured to:
   compute the outer product between 3D feature vectors representing the set of 3D candidates and 2D feature vectors representing the set of 2D candidates to generate a multimodal representation; and
   regress size and orientation of the 3D proposal boxes from the multimodal representation.

20. A non-transitory computer-readable medium storing computer-executable instructions that when executed by a processor cause the processor to:
   determine a first set of 3D proposals using Euclidean clustering on the 3D point cloud;
   determine a second set of 3D proposals from the 3D point cloud based on a 3D convolutional neural network;
   pool the first set of 3D proposals and the second set of 3D proposals to determine a set of 3D candidates;
   project the first set of 3D proposals onto the 2D image;
   determine a first set of 2D proposals based on the image using a 2D convolutional neural network;
   pool the projected first set of 3D proposals and the first set of 2D proposals to determine a set of 2D candidates; and
   pool the set of 3D candidates and the set of 2D candidates.

* * * * *